June 3, 1924.  
J. B. HENDERSON  
GYROSCOPIC COMPASS  
Filed Nov. 8, 1919

Inventor  
James Blacklock Henderson

June 3, 1924.

J. B. HENDERSON

GYROSCOPIC COMPASS

Filed Nov. 8, 1919

INVENTOR.
James Blacklock Henderson
BY
Moakley and Gill
ATTORNEYS.

Patented June 3, 1924.

1,496,087

UNITED STATES PATENT OFFICE.

JAMES BLACKLOCK HENDERSON, OF LEE, ENGLAND.

GYROSCOPIC COMPASS.

Application filed November 8, 1919. Serial No. 336,626.

(GRANTED UNDER THE PROVISIONS OF THE ACT OF MARCH 3, 1921, 41 STAT. L., 1313.)

*To all whom it may concern:*

Be it known that I, JAMES BLACKLOCK HENDERSON, subject of the King of Great Britain, residing at 2 Cambridge Road, Lee, in the county of Kent, England, have invented certain new and useful Improvements in Gyroscopic Compasses (for which I have filed an application in England No. 26,068, Nov. 13, 1913), of which the following is a specification.

The object of my invention is to improve gyroscopic compasses of the Foucault type in which the gyroscope is suspended from a fixed support.

The gyroscopic compass as invented by Foucault consists of a rotor with horizontal axis mounted in bearings in a case or ring which is pivotally supported on horizontal trunnions, the trunnion axis being a little above the centre of gravity of the rotor and casing so that it has gravitational stability on the trunnion axis, the position of stable equilibruim being that in which the rotor axis is approximately horizontal. The horizontal trunnion axis is supported by a vertical ring or frame which is supported on a wire suspension. Such a compass if friction be neglected has no damping arrangement to bring it to the meridian when disturbed, but otherwise it would keep to the meridian when its axis is properly set on the meridian initially, a small elevation of the rotor axis being necessary. When used on a ship or other moving object the torsion head to which the upper end of the wire suspension is attached must be turned as the compass turns so as to keep zero twist in the wire. This has been done electrically by means of a suitable following mechanism.

I have found that this type of compass as now used is subject to deviations and that these deviations are produced by the friction at the horizontal pivots supporting the rotor casing and those supporting the bail weight as used for example in the Sperry compass and also by the rolling of the ship when steering a course which is not along or perpendicular to the meridian.

My invention consists in providing an improved compass in which Foucault's stable arrangement of rotor is used and in which the above errors are eliminated or greatly reduced by damping the precessional motion of the rotor axis by twisting the wire suspension or suspensions of the gyroscope through an angle proportional to the elevation of the rotor axis above or depression below the standard zero position on the meridian, or by inclining the suspension axis of the rotor casing to the horizontal plane, so that the rotor axis is brought back to the meridian when disturbed; and further by employing an auxiliary gyroscope or gyroscopes to control the period of pendular oscillation of the compass in the plane of the rotor. The standard zero position above referred to in the case of a gyroscope which is symmetrical with regard to its axis of suspension is in the meridian but inclined to the horizontal. It can, however, be easily brought into the horizontal plane by suitably loading the gyroscopic casing, so that it will be convenient in the following description of my invention to assume that the horizontal line in the meridian is the standard position of the rotor axis.

In the accompanying drawings, which illustrate methods of carrying my invention into effect, Fig. 1 is a semi-diagrammatic view of a gyroscope with the electrical connections for controlling a motor which imparts the required twist to the gyroscope suspension when the rotor axis is disturbed;

Figure 1:
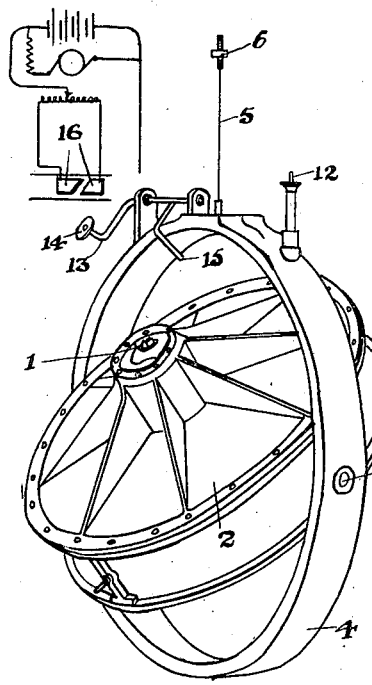
Figure 4:
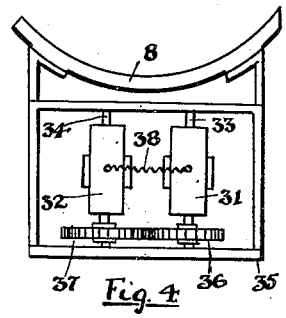
Figs. 4 and 5 are detail views of gyroscopic arrangements for controlling the period of oscillation of a gyroscopic compass in the east-west vertical plane.
Figure 6:
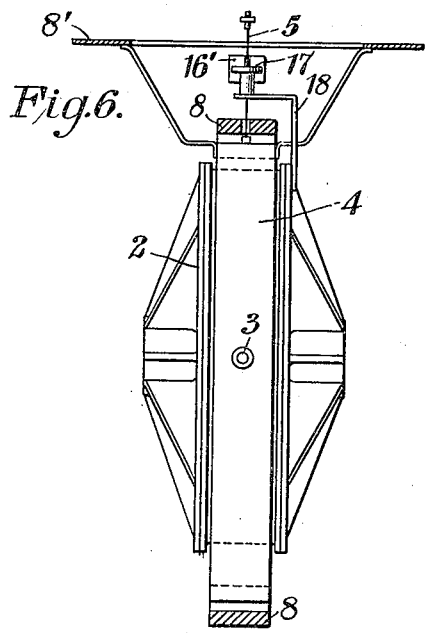
Figure 7:
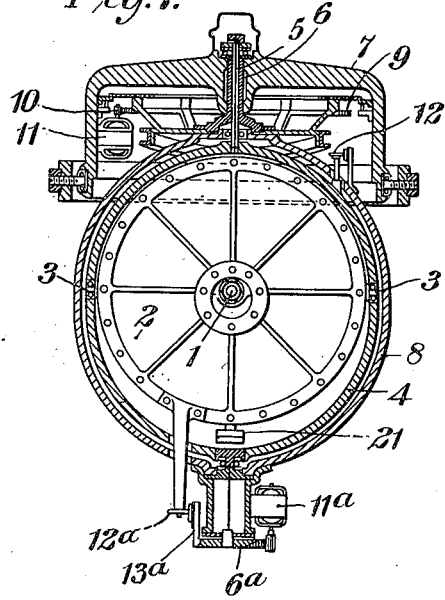
Figure 8:
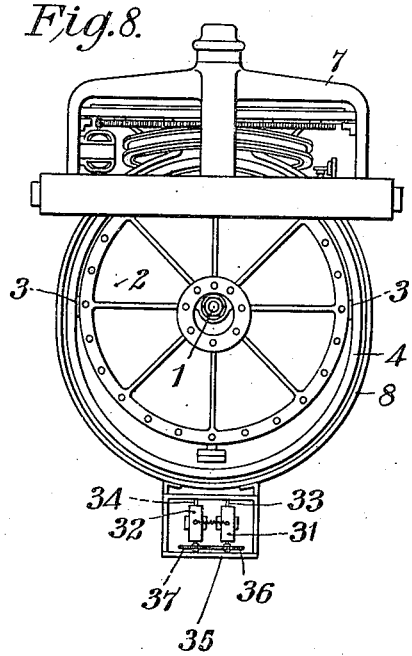
Figure 9:
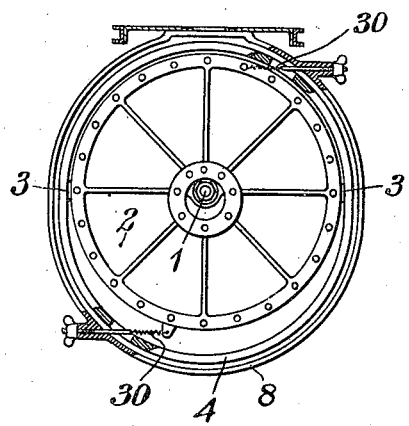

Fig. 6 is a semi-diagrammatic view of a modified form of the instrument of Fig. 1, Fig. 7 is a vertical sectional view of a form of instrument in which a separate wire for the damping couple is employed, Fig. 8 is an elevation of an instrument provided with the arrangement of Fig. 4, and Fig. 9 is an elevation, with parts omitted and portions in section, of an instrument provided with a modified arrangement for producing the damping torque.

Figure 2:
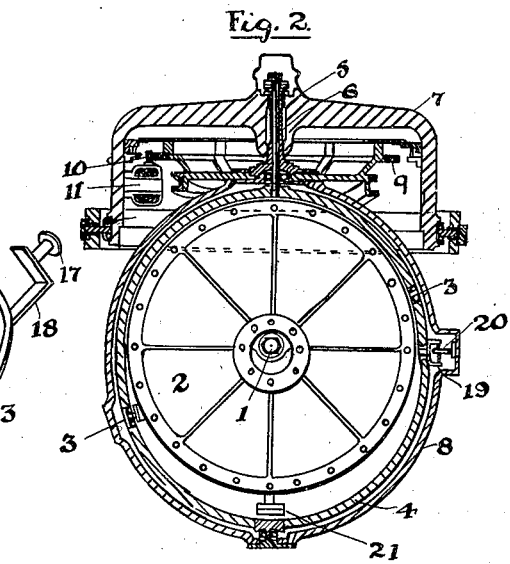
Fig. 2 is a vertical section of a gyroscopic compass embodying a modified form of the invention.

Referring to Figs. 1 and 2, the gyroscope rotor is mounted to rotate on a horizontal shaft 1 within the casing 2 which is pivoted on a horizontal axis 3 (in Fig. 2 this axis is shown inclined for a reason which will be hereinafter referred to). The bearings which support the axis 3 are carried by a ring 4 which is suspended by a torsion wire 5 from a torsion head 6 carried by the compass frame 7. This torsion head is mounted upon a casing or annular element 8 which carries a gear ring 9 with which meshes a gear wheel 10 on the axis of a small reversible electric motor 11 carried by the compass frame. In the Sperry compass this motor is employed to keep zero twist in the suspension 5, being actuated by a contact roller 12 which engages with one or other of two contacts on the torsion head in a well known manner.

According to my invention as illustrated in Fig. 1, instead of the contacts 12 of the mechanism just referred to, I employ a contact arrangement whereby a twist is introduced into the suspension 5 for the purpose of damping the periodic oscillations of the compass about the meridian. This contact arrangement consists of a pivoted cranked arm 13 mounted on the ring 4 of the gyroscope. This arm is adapted to be actuated by the casing 2 of the gyroscope which raises or lowers the contact roller 14 by engagement with the member 15. For the sake of clearness the gyroscope casing is shown very much inclined to the vertical about the axis 3; normally it would be practically vertical and in engagement with the member 15 attached to the pivot axis of the cranked arm 13. A pair of contacts 16 are mounted on the casing 8 integral with the torsion head and these contacts and the contact roller 14 are connected to the electric motor as shown. The insulating space between the contacts 16 is inclined to the vertical and it will be clear that if the contact roller 14 is raised or lowered into engagement with one or other of the contacts 16 by the rotor axis 1 of the gyroscope becoming inclined to the horizontal, the motor will rotate in one or other direction by reversal of the field of the motor so as to twist the suspension 5 until the contact roller 14 breaks contact, thereby stopping the motor. This twist is in such a direction as to damp the precessional oscillation about the meridian.

Thus it will be seen that while the contact roller performs the ordinary function of keeping the top of the wire 5 in constant phase with the bottom of the wire, if the roller is raised or lowered it will alter the relative phase and impart twist to the wire.

According to a modification of my invention as shown in Fig. 6 I may produce the required twist in the suspension 5 by mounting a contact roller 17 on a support 18 fixed to the gyroscope casing. An ordinary two-part commutator 16' with vertical insulation is then used and arranged with respect to the roller 17 so that when the gyroscope swings about its vertical axis the circuit of the motor 11 will be established through one or the other of the parts of the commutator in the usual manner, but a small angular movement of the casing 2 about the trunnion axis 3 will swing the roller into contact with one or the other of the parts of the commutator and produce a displacement between the casing 8 and the ring 4 thus producing a twist in the suspension 5. To produce the necessary damping couples the contact roller 17 is attached to the casing 2 on the appropriate side of the suspension 5. In both the above arrangements a tilt of the gyroscope axis would produce a deviation of the compass since the torsion head carries the compass card 8'. To overcome this defect, the compass card may be attached to the ring 4 as shown in Fig. 6.

I may also employ a wire for the damping couple separate from that used for the suspension, for example a torsion wire may be attached to the bottom of the ring 4 and to a separate torsion head carried by the casing 8 as shown in Fig. 7. In this case an additional motor 11$^a$ would be provided for actuating the lower torsion head 6$^a$ and the motor would be controlled by a roller 12$^a$ carried by the gyroscope casing and engaging contacts mounted on a member 13$^a$ fixed to the torsion head 6$^a$. The movements of the upper torsion head would be controlled by the contact 12 for maintaining zero twist in the suspension and those of the lower torsion head by the contact roller 12$^a$ for producing the damping. The advantages arising from such an arrangement would be that the lower torsion head might have an adjustable arc of motion and that it might also have a much slower motion that the suspension head the speed of which is fixed by the rate of turning of the ship. The motion of the torsion head which controls the damping might advantageously be made so slow that it would only follow the pendular oscillations of the compass on its gimbals to a very small extent.

According to a further method of damping, illustrated in Fig. 2, the rotor casing 2 is supported by the ring 4 on a trunnion axis 3 which is inclined to the horizontal. Any tilting of the rotor axis will introduce a twist in the suspension 5 and in order to prevent this twist being taken out by the automatic action of the following mechanism 10 and 11 the contact roller 19 and commutator 20 controlling the following motor are placed in the horizontal axis of tilt of the gyroscope rotor as shewn.

If the rotor casing tilts about the axis 3, the roller 19 which is attached to the casing moves onto one of the segments of the commutator, thus establishing the circuit of the motor 11 which displaces the torsion head and the casing 8 with respect to the ring 4 until the roller 19 again occupies its normal position between the commutator segments. This displacement will cause the suspension 5 to be placed under torsion.

Figure 3:
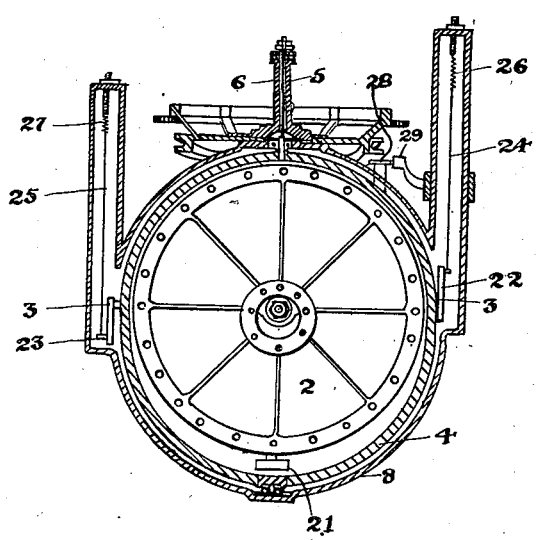
Fig. 3 is a vertical section illustrating a modification of the arrangements shown in Figs. 1 and 2.

Fig. 3 illustrates one method of applying a trifilar suspension for the rotor casing. The rotor casing 2 is supported on the inner gimbal ring on the horizontal trunnion axis 3. To the ends of the axis 3 the cranks 22, 23, are attached and to the crank pins the filars 24, 25 are fastened which are suspended from the torsion head casing 8 by the springs 26, 27. The springs 26, 27 are tensioned so as to take a portion of the weight of the rotor casing, the remainder being taken by the suspension 5. The whole weight might be taken by the two outer filars, but it is probable that the torsional stability would then be too great for satisfactory working of the compass. The tension in the springs would be adjusted to give satisfactory damping. The electric current may conveniently be introduced through the filars 24, 25.

It is evident that if the suspension 5 were discarded, the only purpose which the ring 4 would then serve would be to control the pendular oscillations of the rotor casing relatively to the torsion head casing 8 and to carry the roller contact 28, which bears on the commutator 29, for actuating the motor which turns the casing 8 so as to keep the upper ends of the bifilar suspension in the plane of the trunnion axis 3.

The friction on the trunnions is reduced by the reduction of load on them due to the filars 24 and 25. The filars 24, 25 may either be clamped to the cranks 22, 23 or wrapped round the crank pins or fixed in any other convenient manner.

As a further modification a spring 30 may be attached to the lower end of the casing as shewn in Fig. 9 and a similar spring 30 may be attached in a corresponding position on the right hand side of the casing above the centre, the filars 24 and 25 then being omitted.

The springs are placed between the outer casing and the rotor casing in the vertical plane of symmetry of the compass and it is evident that when the rotor axis becomes tilted a couple with vertical axis acts on the rotor due to the spring tension. The view in Fig. 9 represents the north end of the compass. This method of damping may also be used with the single suspension or Foucault form of compass to which my invention broadly applies.

To reduce the deviation of gyroscopic compasses on board ship, due to rolling of the ship, the period of free oscillation of the compass in the E.W. vertical plane should be as long as possible in order that the amplitude of the forced oscillations in that plane due to rolling of the ship may be as small as possible. For this purpose I make use of two small gyroscopes 31 and 32 as is illustrated in Figs. 4 and 8. The cases of these gyroscopes are pivoted on vertical trunnions 33, 34 on the frame 35, the rotor axes being both horizontal. The trunnion axes are connected by the two toothed wheels 36 and 37 so that the cases can only rotate in opposite directions round the trunnion axes and I constrain the motion round these axes by two springs 38 (only one of which can be seen) placed symmetrically on opposite sides of the frame and interconnecting the rotor casings. The frame 35 is fixed to the torsion head casing 8 of the gyroscopic compass in any convenient position, but it is so arranged that the rotor axes of the two gyroscopes are normally in the E.W. direction.

Figure 5:
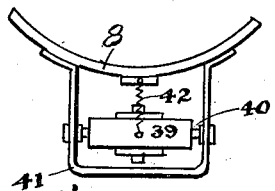

As an alternative to the arrangement shewn in Fig. 4 I may use that illustrated in Fig. 5 where the damping is effected by a single gyroscope. The gyroscope casing 39 is supported on a horizontal trunnion axis 40 in the frame 41 and the casing 39 is constrained in the frame 41 by springs 42 on opposite sides, the rotor axis being normally vertical. Like the frame 35, the frame 41 is attached to the torsion head casing 8 in any convenient position.

The arrangement shewn in Fig. 5 has not only the advantage of greater simplicity over that shewn in Fig. 4 but it has the further advantage in that if the ship rolls when on a quadrantal course the damping gyroscope introduces impulses in the plane of pitching, and the effects of rolling and pitching, in causing the compass to deviate, cancel each other if of equal magnitude. Similarly, when the ship pitches, impulses are introduced by the damping gyroscope in the plane of rolling.

By varying the stiffness of the springs 42 the period of oscillation in the E.W. plane may be varied, but if the springs be made rigid so as to annul the motion of the gyroscope about its trunnion axis the gyroscopic effect on the period of pendular oscillation is not annulled because the torsion head frame 8 is still free to oscillate on the compass gimbals in the N.S. vertical plane. Hence where it is convenient I may fix the casing 39 of the damping gyroscope rigidly on the torsion head frame or on the inner gimbal ring as for instance by replacing the springs by a rigid member.

It has hitherto been proposed to provide auxiliary gyroscopic control of the compass card in the E.W. vertical plane by means of two or more elastically connected gyroscopes for directing the compass the axis of rotation being inclined to each other. But according to my invention I separate the gyroscopic control of the period of pendular oscillation from that of the directing gyroscope by the application of two elastically connected gyroscopes or of a single gyroscope to the frame which supports the main gyroscope.

Having now particularly described and ascertained the nature of my said invention and in what manner the same is to be performed, I declare that what I claim is:—

1. A gyroscopic compass comprising a rotor, a casing therefor supported upon horizontal and vertical axes, and means actuated by movement of the casing about its horizontal supporting axis for applying a damping torque about the vertical axis.

2. A gyroscopic compass comprising a rotor, a casing therefor, a ring within which the casing is supported upon an axis, a suspension for the ring, and means actuated by movement of the casing about its supporting axis for placing the suspension under torsion to apply a damping torque about the vertical axis.

3. A gyroscopic compass comprising a rotor, a casing therefor, a member within which the casing is supported upon horizontal and vertical axes, a filar associated with the member and lying in the vertical plane of rotation of the rotor when its axis is horizontal, and means for applying torsion to the filar to produce a damping couple about the vertical.

4. A gyroscopic compass comprising a rotor, a casing therefor, a ring within which the casing is supported upon a horizontal axis, a suspension for the ring and means actuated by movement of the casing about its horizontal supporting axis for placing the suspension under torsion to apply a damping torque about the vertical axis.

5. A gyroscopic compass comprising a main gyroscope, a supporting element therefor, and an auxiliary gyroscope mounted on the element for controlling the pendular oscillations of the compass in the E.—W. vertical plane.

6. A gyroscopic compass comprising a rotor, a casing therefor, an element within which the casing is supported on horizontal and vertical axes, a follow-up element provided with a frame upon which the supporting element is mounted, a motor for actuating the follow-up element, a pair of fixed contacts associated with one of the elements and a movable contact associated with the other element and adapted to cooperate with a pair of contacts for controlling the motor, said fixed and movable contacts being so arranged that the tilting of the casing about its horizontal axis causes the movable contact to engage one of the fixed contacts to actuate the motor and produce displacement between the supporting element and the frame to cause a damping torque to be applied about the vertical axis.

7. In a gyroscopic compass, the combination of a rotor, a casing therefor, a member within which the casing is supported, a power driven element, a suspension between the member and the element, means for driving the element and means actuated upon relative displacement between the member and the element and controlled by the tilting of the casing about its supporting axis for controlling the driving means to move the element and maintain torsion in the suspension to apply a damping torque about the vertical axis.

8. In a gyroscopic compass, the combination of a rotor, a casing therefor, a member within which the casing is supported, a power driven element, a filar between the member and the element, means for driving the element and means actuated upon relative displacement between the member and the element and controlled by the tilting of the casing about its supporting axis for controlling the driving means to move the element and maintain torsion in the filar to apply a damping torque about the vertical axis.

9. In a gyroscopic compass the combination of a rotor, a casing therefor, a member within which the casing is supported, an element within which the member is supported, and an auxiliary gyroscope mounted upon the element for controlling the pendular oscillations of the compass in the E.—W. vertical plane.

10. In a gyroscopic compass the combination of a rotor, a casing therefor, a member within which the casing is supported, an element within which the member is supported, a pair of auxiliary gyroscopes mounted on trunnions in the element for controlling the pendular oscillations of the compass in the E.—W. vertical plane, connections between the gyroscopes for causing opposite rotation about their trunnion axes and means for constraining the motion around these axes.

11. In a gyroscopic compass the combination of a rotor, a casing therefor, a member within which the casing is supported, an element within which the member is supported, a frame attached to the element, and an auxiliary gyroscope mounted in the frame upon a horizontal axis with its rotor axis normally vertical.

12. In a gyroscopic compass the combination of a rotor, a casing therefor, a member within which the casing is supported, an element within which the member is supported, a frame attached to the element, an auxiliary gyroscope mounted in the frame upon a horizontal axis with its rotor axis normally vertical and means for constraining the movement of the auxiliary gyroscope about its horizontal axis.

Dated this 6th day of October, 1919.

JAMES BLACKLOCK HENDERSON.